April 14, 1925.
L. B. CURTIS
1,533,635
SAFETY DEVICE FOR AUTOMOBILES
Filed Jan. 10, 1924
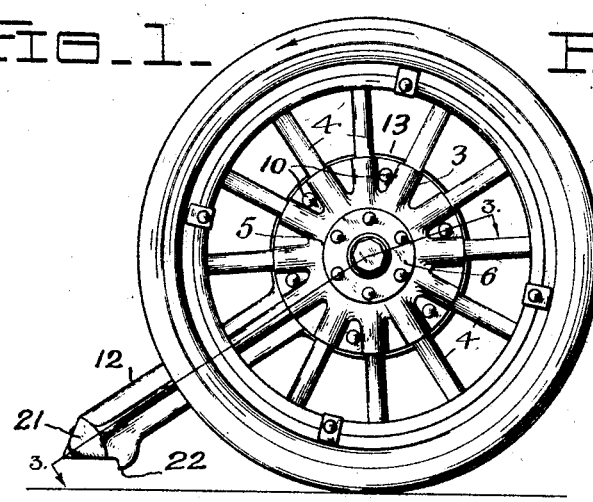
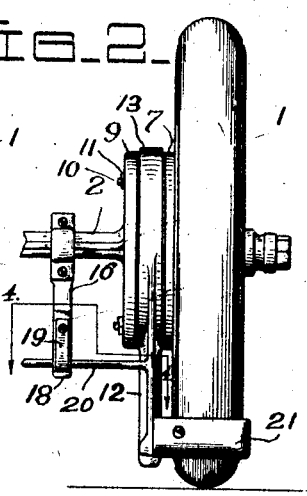
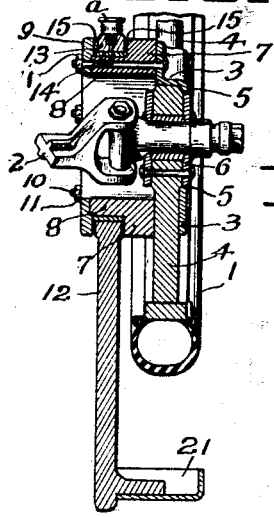
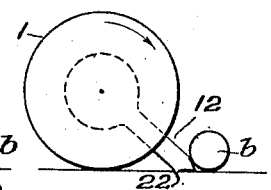
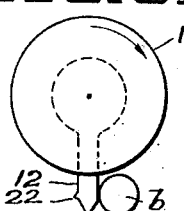
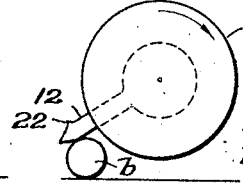
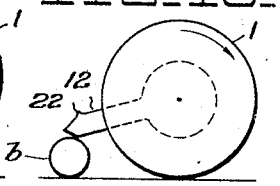
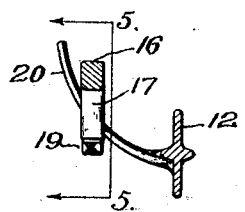
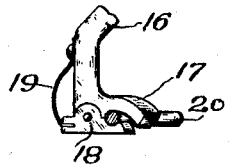
Inventor
Lewis B. Curtis
by
Attorney Patented Apr. 14, 1925.

1,533,635

UNITED STATES PATENT OFFICE.

LEWIS B. CURTIS, OF BRIDGEPORT, CONNECTICUT.

SAFETY DEVICE FOR AUTOMOBILES.

Application filed January 10, 1924. Serial No. 685,334.

*To all whom it may concern:*

Be it known that I, LEWIS B. CURTIS, a citizen of the United States, residing at the city of Bridgeport, in the county of Fairfield and State of Connecticut, have invented certain new and useful Improvements in Safety Devices for Automobiles; and I do declare the following to be a full, clear, and exact description of the invention, such as will enable others skilled in the art to which it appertains to make and use the same.

This invention relates to safety devices for automobiles, but more particularly has reference to means, in the nature of a fender, that is carried by the automobile and positioned immediately beyond the front wheels, the device being yieldable and normally spaced slightly from the roadway, so that, when the automobile is proceeding at a fair speed and knocks down a human being in the path of either front wheel, the latter will not run over and crush the body.

Automobile accidents, primarily due to the knocking down of persons, are rarely converted into fatalities unless the wheels run over and consequently crush the bodies of such persons, and it is the object of the present invention to save human or other life by making it impossible for this to occur.

Referring to the accompanying drawings which form a part of this specification,

Figure 1 is a detail side elevation of a front wheel showing a preferred style of my improvement in connection therewith—

Figure 2 is a front view of the same showing the axle broken away—

Figure 3 is a section at line 3—3 of Figure 1—

Figure 4 is a section at line 4—4 of Figure 2—

Figure 5 is a section at line 5—5 of Figure 4—

Figures 6, 7, 8, 9, and 10, are schematic views illustrating the operation of the invention as portrayed at Figures 1, 2, and 3—

Similar numerals of reference denote like parts in the several figures of the drawing.

Each of the front wheels is equipped with my improvement, but as the construction associated with both wheels is identical, I have shown and will describe my invention as constructed, arranged and functioning, with respect to one wheel only.

Referring particularly to sheet one of the drawing, 1 is the front wheel constructed and journaled as usual, and 2 is the front axle.

3 is a corrugated metal plate which fits the wheel spokes 4 closely, and has a central opening 5 that snugly conforms to the usual hub plate 6.

7 is a hollow drum which is stepped so as to provide a portion 8 of reduced diameter, and 9 is a ring at the inside of the drum, and the drum and ring are secured together by bolts 10 extending from the outer face of the plate 3 through the drum and ring, and nuts 11 driven on the bolts against the ring.

The drum is thus firmly secured to the wheel, and since the drum is hollow it cannot interfere with any of the parts of the steering gear.

12 is a lever whose inner end is formed into a ring 13 that journals around the reduced portion 8, an ordinary bearing ring 14 being interposed between the parts, similar bearing rings 15 being positioned at the sides of this ring 13.

It will thus be seen that the lever is free to swing around the drum. Any suitable grease cup *a* may be located in the ring 13 to lubricate the bearings thereof.

16 is a hanger bolted to the axle and having its lower end formed into a stationary jaw 17, and pivoted to the hanger is a movable jaw 18, and 19 is a spring whose ends are secured to the hanger and the movable jaw, the function of this spring being to keep this jaw normally closed.

Extending laterally from the lever 12 is a curved rib 20 which normally is embraced by the jaws 17, 18, the latter being suitably conformed throughout their grasping faces so that this rib may move freely therebetween.

When this rib is held in this manner, the parts of my improvement are all in normal position, with the lever 12 extended at an angle to the roadway, the free end of the lever being slightly spaced from the roadway immediately in front of the wheel as shown at Figures 1 and 2.

Any suitably shaped fender plate 21 is secured to the end of the lever and the heel end of the bottom of the latter is formed into a spur 22 for the purpose presently to be explained.

The curved rib 20 establishes such a connection between the lever and the jaws 17, 18, that this connection will be maintained when the wheels are turned or cramped.

The operation of my improvement is as follows:—

If the car is traveling slowly or even at a moderate speed and knocks a person or an animal down within the path of one of the wheels, the lever 12 will merely shove the obstruction ahead until the car stops, or, possibly will push it to one side out of such path. But should the car be going at a greater speed, the body when knocked down in the path of a wheel will force the lever rearwardly and thus release the rib 20 from the jaws, and the spur 22 will dig firmly into the roadway, thus opposing the travel of the car, and this will cause the axle and wheel to be raised bodily, and the wheel will jump or vault over the body as portrayed in the schematic views, Figures 6 to 10 inclusive, the body or obstruction being denoted by $b$.

It is presumed, of course, that the driver of the car will put on his brakes immediately as soon as he sees that there is a likelihood of striking the person or animal, and it is therefore possible that the additional force applied by the lever to oppose the travel of the car, will result in the stopping of the latter before the wheel has jumped the body, but, in the event that the speed of the car is too great for this contingency, the lever will function to cause the wheel to jump the body, and the car will undoubtedly stop before either of the rear wheels can run over the body.

The injury to the car by this abrupt braking by the lever or by the jumping, or the replacement of the lever to its normal position, are matters of no account, as compared with the saving of a life.

What is claimed is:—

1. In an automobile safety fender, a member normally spaced from the roadbed and swung concentrically from the axle and extending to a plane slightly beyond a front wheel and releasably held in this position and adapted, when impacting a body, to yield and to be forced against the roadway, thereby functioning as a lever to oppose the speed of the automobile, whereby the wheel adjacent said lever will be bodily raised over said body and deposited on the roadbed beyond said body.

2. In a device of the character described, drums secured to the inside of each front wheel of an automobile concentric with the axle of the wheel, levers having at their inner ends ring bearings that are journaled around said drums, resilient supports sustained from the front axle and connections between said levers and supports whereby the levers are normally and yieldably held in a position slightly spaced from the roadway with their free ends immediately beyond said wheels.

3. In a device of the character described, the combination with the front axle of an automobile, of levers swingingly carried concentric with said axle and yieldably held with their free ends normally spaced from the roadway and positioned immediately beyond the front wheels, whereby, when the automobile is speeding and one of the said levers strikes a body on the roadway, the lever will yield and dig into the roadway, thus opposing the speed of the car and causing the wheel adjacent said lever to jump said body.

In testimony whereof I affix my signature hereto.

LEWIS B. CURTIS.